March 5, 1940.                  S. FERENTZY                    2,192,675
                APPARATUS FOR AND METHOD OF MANUFACTURING LIPSTICKS
                    Filed Dec. 1, 1937            2 Sheets-Sheet 1
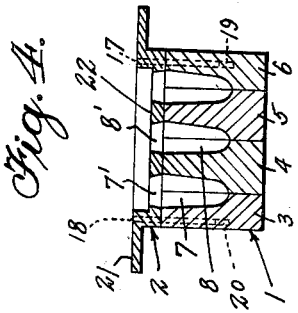
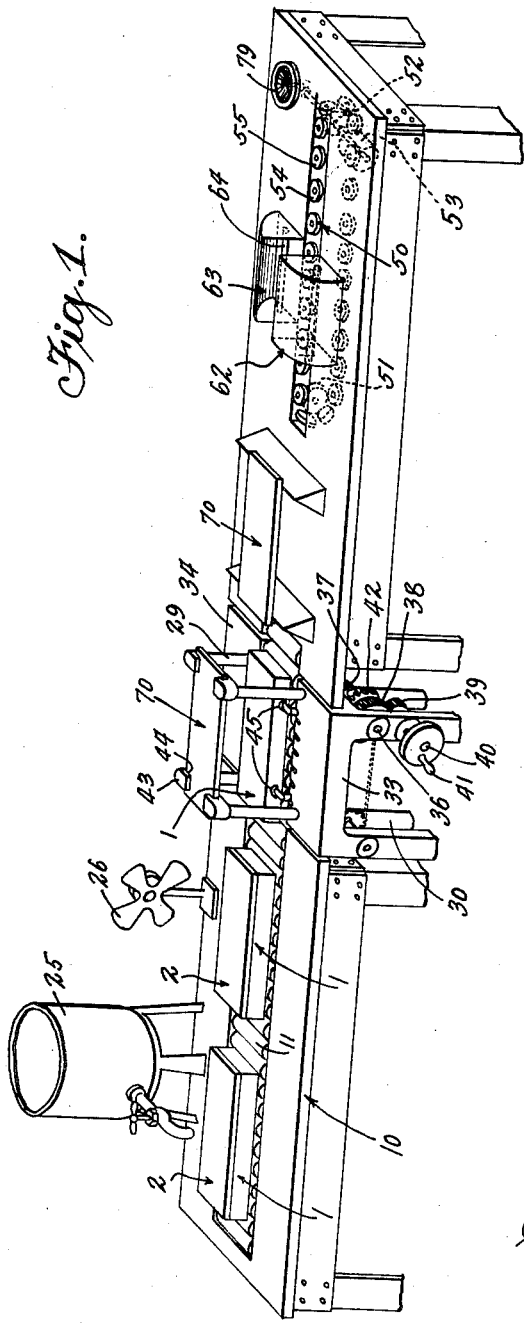
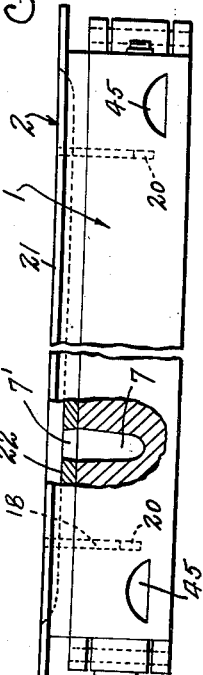
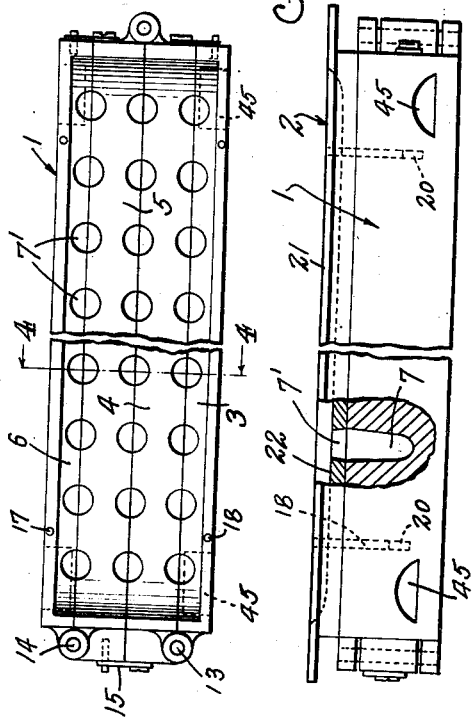
Inventor
Steven Ferentzy
By Lyon & Lyon
Attorneys March 5, 1940.  S. FERENTZY  2,192,675
APPARATUS FOR AND METHOD OF MANUFACTURING LIPSTICKS
Filed Dec. 1, 1937  2 Sheets-Sheet 2

Inventor
Steven Ferentzy
By Lyon & Lyon
Attorneys

Patented Mar. 5, 1940

2,192,675

UNITED STATES PATENT OFFICE 2,192,675

APPARATUS FOR AND METHOD OF MANUFACTURING LIPSTICKS

Steven Ferentzy, Los Angeles, Calif., assignor to Max Factor & Co., Los Angeles, Calif., a corporation of Delaware Application December 1, 1937, Serial No. 177,537

8 Claims. (Cl. 18—1)

This invention relates to methods of and means for manufacturing lipsticks and similar articles in a rapid, economical and facile manner. Although the description given herein will be specifically directed to the manufacture of lipsticks, it is to be understood that similar articles of approximately cylindrical or conical form made from thermoplastic compositions may also be manufactured by the use of the improvements to which this invention is directed.

Heretofore articles such as lipsticks have been formed by casting a suitable composition in a mold from which the formed object was then withdrawn. These formed objects were then fitted into suitable holders. Prior methods of manufacture involved numerous manual operations and as a result labor costs were high and the number of imperfectly formed pieces contributed greatly to the low production per worker and the high cost per manufactured unit.

The present invention relates to methods whereby a large number of lipsticks may be readily manufactured and fitted into suitable holders, these operations being carried out in such manner that the lipstick itself is not handled manually, thereby obviating one commonly encountered cause of trouble, namely, that of distortion of the plastic body material by the fingers of the operators. Furthermore, the method of this invention permits the handling of a large number of lipsticks simultaneously so that the process becomes in effect a continuous one. Means are also provided whereby the molding operation is facilitated and the lipsticks are readily and positively mounted in their holders and subjected to a heat glazing operation. The arrangement of units used in carrying out these operations is such as to facilitate the manufacture of large numbers in a short period of time.

An object of this invention, therefore, is to disclose and provide an improved method of manufacturing lipsticks and the like in a rapid and economical manner.

Another object is to disclose a method of fitting a plurality of lipsticks into holders simultaneously.

Again, an object of the invention is to provide a continuous method of heat glazing lipsticks in a continuous manner.

Another object is to provide means whereby a plurality of lipsticks may be formed simultaneously.

Another object is to provide means for forcing a plurality of lipsticks into holders simultaneously.

A further object is to provide means for conveying and heat glazing lipsticks.

A still further object is to provide means for facilitating the assembly of lipsticks into separate holders.

These and other objects, uses, advantages, adaptations and modifications of the invention will become apparent to those skilled in the art from the following detailed description of illustrative forms of the invention. In such description reference will be made to the appended drawings, in which:

Fig. 1 is a diagrammatic perspective of a forming, assembling, fitting and finishing table.

Fig. 2 is a side elevation of a mold for use in the invention.

Fig. 3 is a plan view of the mold shown in Fig. 2.

Fig. 4 is a vertical section taken along the plane IV—IV of Fig. 2.

Figure 5:
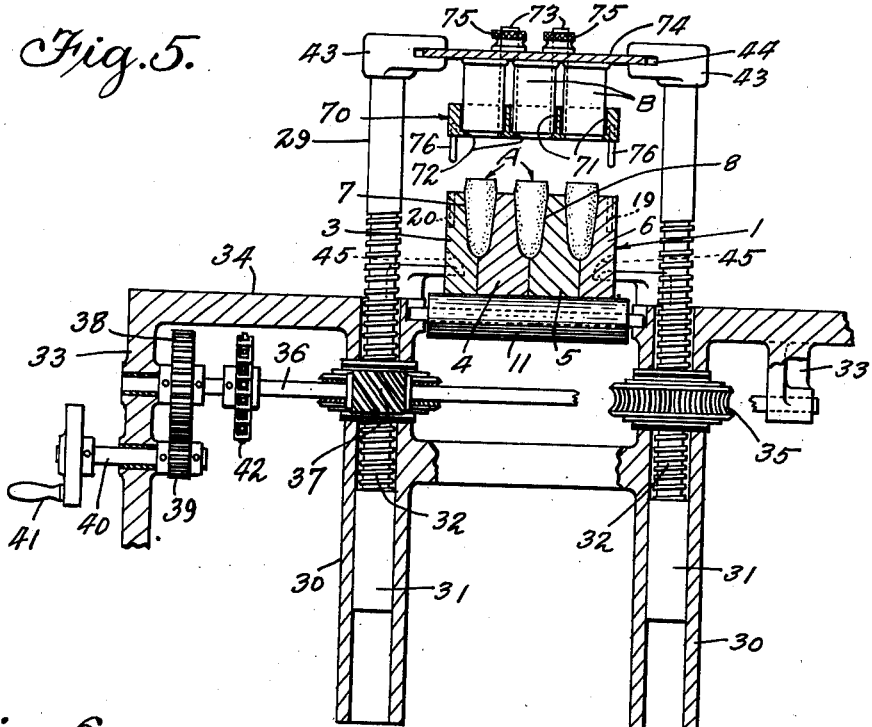
Fig. 5 is a vertical section through the work table, illustrating means for fitting holders onto the lipsticks.

Generally stated, the present invention is drawn to a method in which split or segmental molds are employed, these molds being so arranged that one segment or portion of the mold may be removed, exposing a portion of the finished article or lipstick. The individual holders for the lipsticks are then forced onto and made a part of the molded object while a major portion of the object is still retained within its original mold. The lipsticks now attached to their holders are then conveyed along a path of travel and rotated during such movement so as to expose the entire surface area of the lipstick to the action of a sufficiently high heat to glaze the surface of the lipstick. The lipsticks are then removed from their holders and brought in contact with a closure device which facilitates final assembly.

These operations are diagrammatically illustrated in Fig. 1. As there shown the work table, generally indicated at 10, may be provided with a roller type of conveyor 11 adapted to form a line of travel for the various molds. The various operations which take place on this work table are indicated as those of filling the mold, cooling, topping, fitting, etc.

The mold used during the filling, cooling and topping steps is more specifically shown in Figs. 2 to 4. As there shown, the mold comprises a lower body portion 1 and an upper portion 2. The body portion 1 is designed to make three rows of lipsticks, as shown in Figs. 3 and 4, and comprises four members 3, 4, 5 and 6 respectively, these members being hingedly connected to each other so as to permit the mold to be opened for the purpose of cleaning the mold cavities 7, 8, etc. For example, the members 3 and 4 may be hingedly connected at one end as by the hinge 13. The members 4 and 5 may be hinged together at the same end of the mold as at 14. These two hinge portions 13 and 14 may then be joined together as by means of a latch member 15. The opposite end of the body portion 1 may be held together by a hinge joining the members 4 and 5 and by latch members whereby the free ends of members 3 and 6 may be connected to the members 4 and 5.

The mold cavities 7 and 8 are thus split lengthwise and when the apparatus is used in manufacturing lipsticks, said mold cavities 7 and 8 are slightly conical, the upper or open ends of said cavities being of slightly greater diameter than the diameter of the cavities near the closed or rounded tip, thereby facilitating ready withdrawal of the molded objects from the forming cavities.

The upper portion 2 of the mold is provided with forming cavities 7', 8', etc., which are coaxial with the forming cavities 7, 8, etc., of the body portion 1. The upper portion 2, however, is preferably of one piece of metal and the forming cavities 7', 8' and the like are adapted to form the butt ends of the lipsticks. These forming cavities 7', 8', etc., are preferably conical and of greater cross-sectional area at the bottom than at the top. The degree of taper has been exaggerated in the drawings in order to facilitate understanding. It will be appreciated that as shown in the drawings each lipstick will be provided with a tip and with a butt end, each lipstick tapering toward its tip and its butt from an intervening zone which lies at the plane of contact between the body portion 1 and the top member 2 of a forming unit or mold.

Registration of the upper member 2 with the body portion 1 is assured by means of registration pins 17, 18, etc., attached to the upper portion 2 and extending into bores 19 and 20 formed in the body portion 1. These registration pins tend to hold the body portion 1 together and make certain that the forming cavities 7', 8', etc., of the upper portion 2 register perfectly with the cavities in the body portion 1 of the device.

It is to be noted that the upper portion 2 is provided with an outwardly extending flange 21 and a depressed inner surface 22 from which the forming cavities 7', 8', extend.

Figure 6:
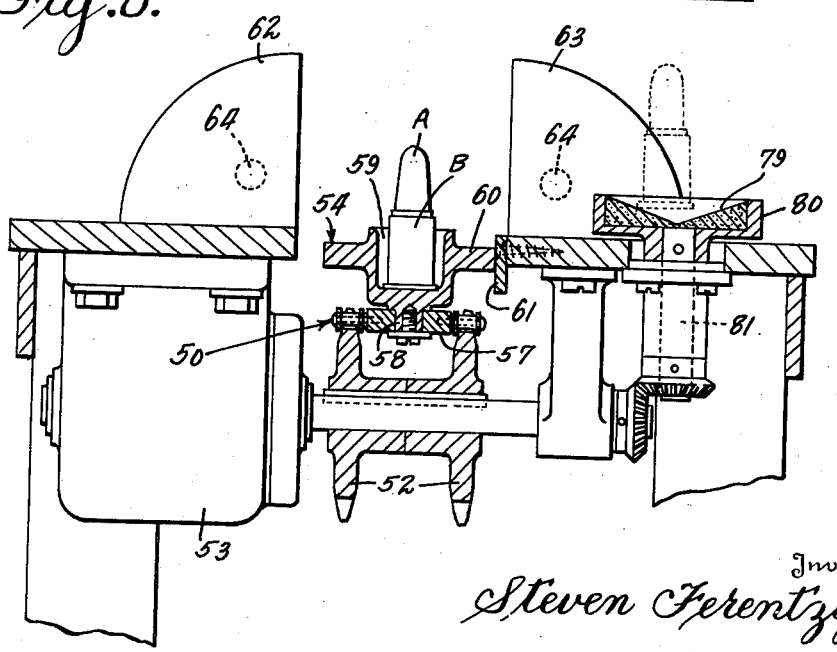
Fig. 6 is a transverse section through a glazing unit.

At the filling zone of the work table 10 the assembled mold is filled with a heated and substantially fluid composition from a suitable reservoir 25. Excess material is removed by moving a squeegee, scraper, or the like over the surface 22, which surface preferably emerges into a rounded fillet at the ends of the mold. The assembled mold is then advanced along the conveyor 11 to a cooling zone wherein it may be subjected to the action of cooling air as from a fan or blower 26. If desired, this cooling section of the work table may be provided with a hood or housing through which carbon dioxide or refrigerated air or gas may be circulated. The mold then advances to the topping and fitting section of the work table. This section of the work table may be constructed in accordance with Figs. 5 and 6, which figures depict suitable means for removing the upper portion 2 from the mold assembly and for fitting holders onto the lipsticks. As there shown, the work table may comprise hollow legs 30 provided with smooth internal bores adapted to receive shafts provided with cylindrical plunger ends 31 and upper threaded ends 32 of smaller diameter.

Four such legs may be held in suitably spaced relation by means of a table frame provided with side rails 33 and cross members 34. Rollers of the conveyor 11 may be journaled in the flanges 33, the upper surfaces of the rollers 11 being at a slightly higher elevation than the surface of the connecting members 34. An internally threaded worm wheel 35 mounted between suitable bearings is carried by each of the legs 30 and in engagement with the threaded portion 32 of the vertical shaft 29. A cross shaft 36 is journaled in bearings carried by the longitudinal rails 33, such cross shaft carrying worms 37 in engagement with the worm wheels 35. The shaft 36 also carries a spur gear 38 in engagement with a pinion 39 mounted upon a stub shaft 40 provided with a hand wheel 41. A suitable chain passing over sprocket 42 carried by the transverse shaft 36 imparts rotation to a similar cross shaft provided with worms in engagement with the worm wheels carried by another pair of legs. Rotation of the wheel 41 will therefore cause the shafts 29 to rise or fall in unison. The top of each shaft 29 is provided with a head 43 having a slot 44 adapted to receive portions of the molds which are to be assembled.

The work table 10 is also provided with a continuous conveyor, generally indicated at 50, mounted upon sprockets 51 and 52 and driven by a motor 53. This continuous conveyor carries a plurality of spaced carriers such as the carriers 54, 55, etc., which move along the aperture 56 formed in the table. The continuous conveyor 50 includes connecting links 57 whereas the carriers 54 are provided with bosses 58 which extend into and are journaled in the connecting members 57. The carriers 54 are provided with an internal cavity 59 and carry a rim 60. The cavity 59 is of a size adapted to receive a lipstick A mounted in its holder B. A stationary friction plate 61 is carried by the table 10 and the rim 60 of the carriers is adapted to contact with the friction plate 61, such friction plate being arranged on one side of the line of travel of the conveyor 50. In this manner the carriers 54 are rotated while they travel along the slot 56.

In operative relation to the conveyor 50 are heating means such as, for example, the housings 62 and 63, each of said housings including resistance elements, gas flames, or other suitable sources of heat, the drawings specifically showing heated resistance bars 64. The lipsticks carried by the conveyor 50 are subjected to the heat emanating from the bars 64, the number of heating elements being correlated with the speed of the conveyor so as to subject the lipsticks to a heat glazing operation during the brief exposure to the heat.

In actual operation, the heated thermoplastic substance from the heated container 25 is conveyed to the mold comprising the lower and upper portions 1 and 2 by means of a spout 25a provided with a suitable valve. After the mold cavities have been filled with the thermoplastic material in substantially fluid form, excess material is removed from the top and the mold assembly is moved along the line of support established by the conveyor 11 to the cooling zone. Thereafter the cooled molds are introduced into the means for assembling and dissembling the molds, shown more specifically in Fig. 5.

In the first operation the mold is introduced between the shafts 29, the flange 21 of the upper portion 2 being moved into the slots 44 of the heads 43. Suitable latches carried by the transverse members 34 are then inserted into the recesses 45 formed in the side walls of the lower body portion 1 for the purpose of holding said lower body portion down against the work table or line of support. By actuating the crank 41 the vertical shafts 29 are caused to move upwardly, thereby lifting the upper section 2 of the mold. Since the bores 7', 8', etc., are either cylindrical or slightly tapered downwardly and outwardly, the upper portion of the mold is removed and separated from the lower portion, this operation exposing the butt ends of the lipsticks formed in the molds.

While this operation is taking place, another operator has been arranging lipstick holders in a centering frame 70. These centering frames are provided with a plurality of recesses 71 having apertures 72 of substantially the same cross-sectional area as the top of the mold cavities in the lower body portion 1. The individual lipstick holders B are placed in the cavities 71 in an inverted position.

These lipstick holders B may be of the type which includes two telescoping elements, the inner portion moving in and out of the outer and lower portion so as to place the lipstick in ejected or in withdrawn position. When these lipstick holders B are placed on the centering frame 70, they are in ejected position, i. e., the inner member which actually holds the lipstick is in a position furthest removed from the base of the holder. The holders are manually manipulated into the described ejected position before they are placed on the centering frame and the cavities 71 of the centering frame 70 prevent rotation of the holders B after such holders are received by the recesses of the centering frame. Bars, fingers, or other devices are generally formed in the inner member for the purpose of engaging with the butt end of a lipstick.

The centering frame 70 is also preferably provided with upstanding, externally threaded bolts 73 which are caused to pass through a presser plate 74, this presser plate resting upon the tops of the lipstick holders B and held in that position by means of thumb screws 75. The centering frame is furthermore provided with registering means such as the pins 76 which depend therefrom and which are adapted to enter the registering bores 19 and 20 formed in the lower body portion 1 of the mold.

After the upper portion 2 of the mold assembly has been removed as described hereinabove for the purpose of exposing the butts of the lipsticks, the longitudinal edges of the presser frame 74 are fitted into the grooves 44 in the heads 43 of the vertical shafts 29 and then slowly lowered by means of the crank 41 so as to cause the registering pins 76 to enter the bores 19 and 20 of the lower body portion 1. This downward movement is continued until the butts of the lipsticks are forced into the holders B carried by the centering frame. Thereafter by actuating the crank 41 the centering frame is lifted. During such lifting operation the lipsticks are removed from the forming cavities in the lower body portion 1 of the mold.

The presser plate 74 is then removed and the lipsticks now firmly held in their individual holders B are placed within the carriers 54 journaled upon the continuous conveyor 50 and passed by said conveyor through the heating zone where they are subjected to a sufficient amount of heat to heat-glaze the surface of the lipstick, thereby removing minor imperfections, bubbles, fins, etc., which may be left by the mold surfaces upon the lipsticks. Another operator removes the now heat-glazed lipsticks from the carriers 54 at the other end of the conveyor 50 and contacts the base of each lipstick holder B with a dished, rotating, yieldable member 79 carried upon a disc 80 mounted upon the driven shaft 81, which shaft may be driven by the same motor 53 that drives the continuous conveyor 50. Rotation is this imparted to the bottom of the holder B and the lipstick is withdrawn into the holder, permitting the operator to apply the remaining portion or cover to the holder, thereby producing a finished, completely assembled article.

I claim:

1. In a method of making lipsticks and the like, the steps of simultaneously casting a plurality of lipsticks in a mold, each lipstick tapering toward its tip and also toward its butt from an intervening zone, exposing the butts while retaining the major portion of each lipstick in the mold, and then forcing the exposed butts into individual lipstick holders while the major portion of each lipstick is still retained in the mold.

2. In a method of making lipsticks and the like, the steps of simultaneously casting a plurality of lipsticks in a mold, each lipstick tapering toward its tip and also toward its butt from an intervening zone, exposing the butts while retaining the major portion of each lipstick in the mold, then forcing the exposed butts into individual lipstick holders while the major portion of each lipstick is still retained in the mold, and removing said lipsticks from the mold with holders attached thereto.

3. In a method of making lipsticks and the like, the steps of simultaneously casting a plurality of lipsticks in a mold, each lipstick tapering toward its tip and also toward its butt from an intervening zone, exposing the butts while retaining the major portion of each lipstick in the mold, then forcing the exposed butts into individual lipstick holders while the major portion of each lipstick is still retained in the mold, removing said lipsticks from the mold with holders attached thereto, and then conveying the lipsticks and holders through a heating zone to heat-glaze the lipsticks.

4. In a method of making lipsticks and the like, the steps of simultaneously casting a plurality of lipsticks in a mold, each lipstick tapering toward its tip and also toward its butt from an intervening zone, exposing the butts while retaining the major portion of each lipstick in the mold, then forcing the exposed butts into individual lipstick holders while the major portion of each lipstick is still retained in the mold, removing said lipsticks from the mold with holders attached thereto, then conveying the lipsticks and holders through a heating zone to heat-glaze the lipsticks, and rotating the lipsticks while in said heating zone.

5. In a method of making lipsticks and the like, the steps of filling a mold provided with a plurality of spaced molding cavities with a thermoplastic composition; cooling said mold to harden said composition; removing a portion of the mold to expose the butt ends of objects molded from said composition; forcing holders over the exposed butt ends of said objects, and withdrawing said objects from the mold by means of said holders.

6. In a method of making lipsticks and the like, the steps of filling a mold provided with a plurality of spaced molding cavities with a thermoplastic composition; cooling said mold to harden said composition; removing a portion of the mold to expose the butt ends of objects molded from said composition; forcing holders over the exposed butt ends of said objects, withdrawing said objects from the mold by means of said holders; and passing said objects through a heating zone to heat-glaze said objects.

7. In an apparatus adapted for use in the manufacture of lipsticks, a mold including a lower section having a plurality of cavities therein, and a centering frame provided with apertures in register with the cavities of said molds, means for lowering said centering frame with its apertures in register with said cavities, and means for holding lipstick holders in position over said apertures in said centering frame.

8. In an apparatus adapted for use in the manufacture of lipsticks, a mold having a lower section comprising a plurality of portions in side to side relation, each of the opposite ends of not less than one of said portions being hingedly connected to a different adjacent portion; a plurality of cavities in said lower section, said cavities being bisected axially by planes of contact between adjacent portions of said mold; and a centering frame provided with apertures in register with the cavities of said mold, means for lowering said centering frame with its apertures in register with said cavities, and means for holding lipstick holders in position over said apertures in said centering frame.

STEVEN FERENTZY.